March 20, 1945.   R. T. COOK   2,372,059
EYEGLASS FRAME
Filed Sept. 3, 1943   2 Sheets-Sheet 1

INVENTOR.
Roland T. Cook,
BY George D. Richards
Attorney

March 20, 1945.  R. T. COOK  2,372,059
EYEGLASS FRAME
Filed Sept. 3, 1943  2 Sheets-Sheet 2
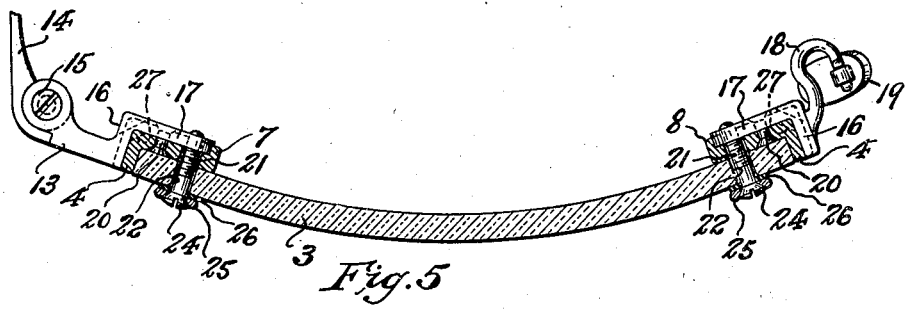
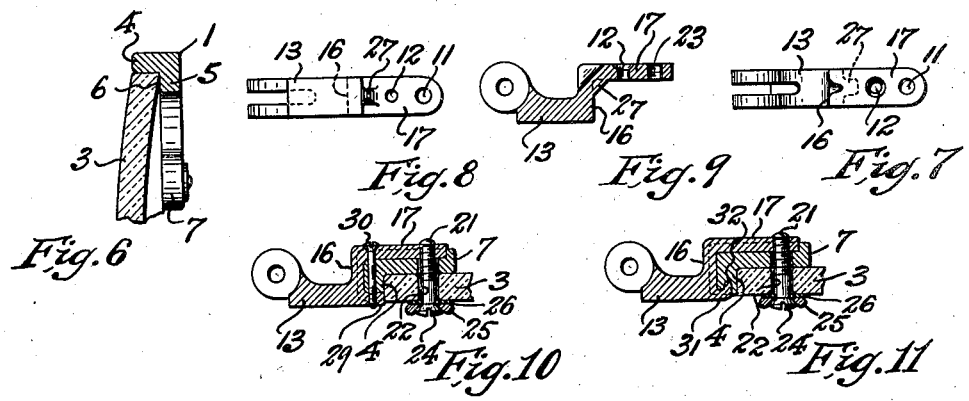
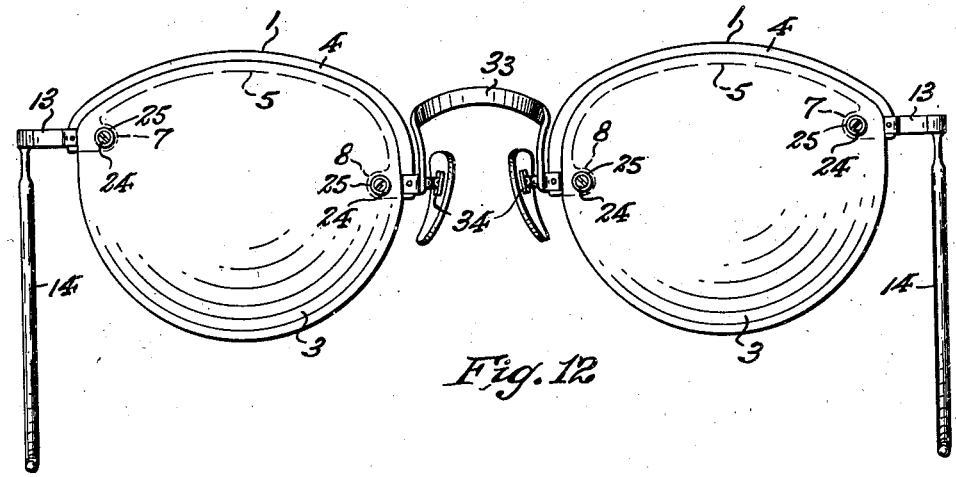
INVENTOR.
Roland T. Cook,
BY George D. Richards
Attorney Patented Mar. 20, 1945

2,372,059

UNITED STATES PATENT OFFICE 2,372,059

EYEGLASS FRAME

Roland T. Cook, Irvington, N. J., assignor to New Jersey Optical Company, Irvington, N. J., a corporation of New Jersey Application September 3, 1943, Serial No. 501,120

5 Claims. (Cl. 88—41)

This invention relates to improvements in eyeglass frames; and the invention has reference, more particularly, to a novel eyeglass frame of the partial or top rim type.

This invention has for an object to provide an eyeglass frame having partial or top rim sections of plastic material, shell or like material adapted to embrace and seat the top edge portions of the eyeglass lenses, the frame structure being provided with novel cooperative means for securing both the lenses and frame fittings, such as temples, nose bridge, or nose pad elements, to the rim sections, in such manner as to hold said fittings in strongly and rigidly interlocked relation to the rim sections, while at the same time bracing and reenforcing said rim sections against warping, distortion or other displacement.

Another object of this invention is to provide in eyeglass frames of the kind above mentioned novel strap structures and cooperative rim section seating means therefor, whereby frame fittings, such as temples and nose bridge or nose pad elements, may be strongly and rigidly joined to the rim sections and to the eyeglass lenses embraced by the latter, and whereby the lenses are so supported and secured as to be free from strain when said fittings are manipulated.

A further object of this invention is to provide novel constructions of reenforced strap means for anchoring temples and nose bridge or nose pad elements of the frame to the rim sections of the latter, whereby rigidity of connection between said strap means and the temple hinges and nose bridge or nose pad supports is assured, free from relative loose play or vibration.

Other objects of this invention, not at this time more particularly enumerated, will be understood from the following detailed description of the same.

Illustrative embodiments of this invention are shown in the accompanying drawings, in which:

Fig. 1 is a front face elevation of an eyeglass frame made according to the invention; Fig. 2 is a rear face elevation of the same, the temple bows being shown in cross section, Fig. 3 is a front face elevation of combined unitary rim sections and nose bridge per se made of plastic material and according to the invention; Fig. 4 is a rear face view of the same; Fig. 5 is a horizontal sectional view, taken on line 5—5 in Fig. 1, but drawn on an enlarged scale; and Fig. 6 is a fragmentary vertical cross-sectional view, taken on line 6—6 in Fig. 1, and also drawn on an enlarged scale.

Fig. 7 is a detail external face view of a hinge and strap portion of a temple element; Fig. 8 is an internal face view of the same; and Fig. 9 is a central longitudinal sectional view thereof.

Fig. 10 is a fragmentary sectional view similar to that of Fig. 5, but showing a modified form of strap structure for a temple hinge connection of a temple element or for a nose bridge or nose pad support; and Fig. 11 is a similar view showing another modified form of strap structure.

Fig. 12 is a front face elevation of an eyeglass frame having separate plastic top rim sections, joined by a combined metallic nose bridge and nose pad structure, and including strap structures according to this invention for joining the latter and the temple elements to the rim sections.

Similar characters of reference are employed in the above described views, to indicate corresponding parts.

Figure 1:
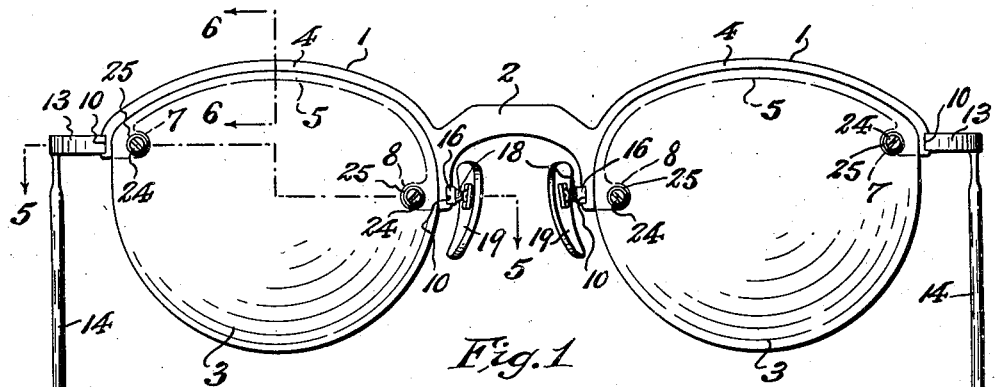
Figure 2:
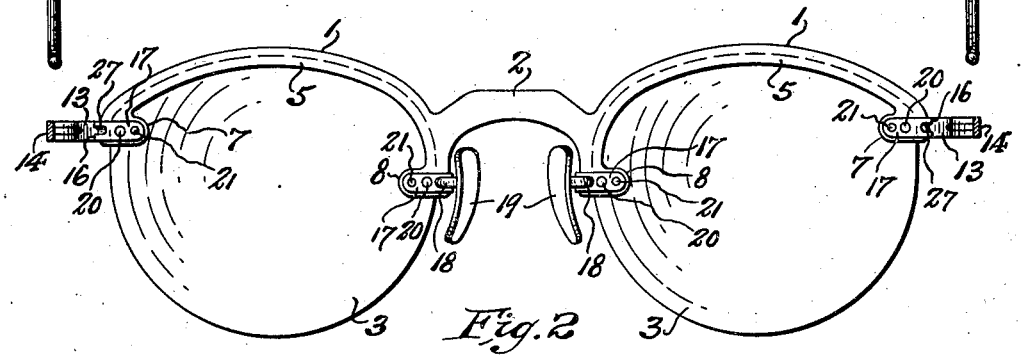
Figure 3:
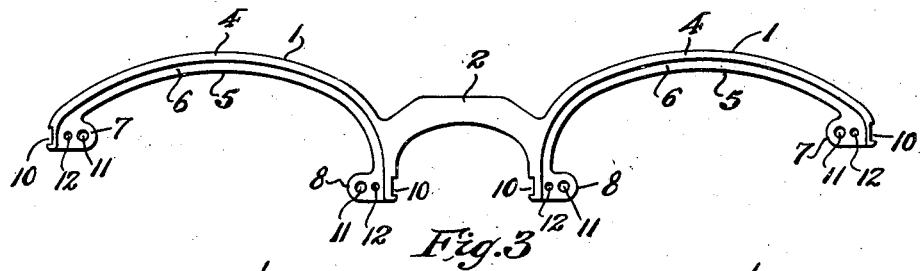
Figure 4:
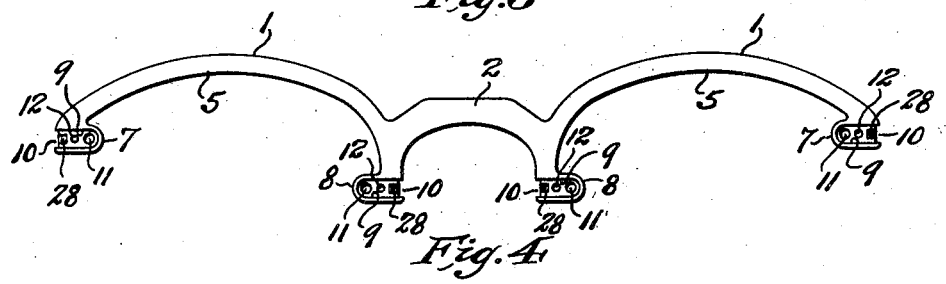

Referring to the drawings, and more particularly to Figs. 1 to 4 inclusive, the eyeglass frame, as therein shown, comprises oppositely extending top rim sections 1 integrally connected by an intermediate bridge piece 2 so as to provide a unitary structure, the same being made of a suitable plastic material, shell or the like. The rim sections 1 may be made in variously designed arcuate shapes as to the longitudinal extent thereof and so as to conform to the top peripheral shape of lenses 3 to be embraced thereby. Each rim section comprises a peripheral wall 4 to abut the edge of a lens 3 applied thereto, and coincident with and springing angularly from the rear marginal portion of said peripheral wall 4 is a supporting wall or ledge portion 5, whereby the rim section is provided with a forwardly open lens receiving and supporting seat 6 formed by the included angle of the inner faces of said peripheral wall 4 and said supporting wall or ledge portion 5.

Extending inwardly from the outer or temporal ends of the rim sections 1, in the plane of and as extensions of supporting walls or ledge portions 5 of said rim sections, are anchor lugs 7, and, in like manner, extending inwardly from the inner or nasal ends of the rim sections 1 are similar anchor lugs 8. On their rear or external faces said lugs 7 and 8 are each provided with outwardly open, longitudinally extending, countersunk strap seats 9, and the external edge faces of the rim section peripheral walls 4 are provided with outwardly open transverse notches 10 which intersect the outer open ends of said strap seats 9. Adjacent the inner ends of said lugs 7 and 8, the same are provided with through openings 11 the purpose of which will presently appear, and said lugs 7 and 8 are also provided between their outer ends and said openings 11 with additional openings 12, the purpose of which will likewise be hereinafter explained.

Secured to the outer or temporal ends of the rim sections 1 are temple end pieces or hinge knuckle arms 13 to which the temple fittings 14 are pivotally connected by pivot screws 15 in the customary manner familiar to the art. Connected with each temple end piece or hinge knuckle arm 13, so as to be unitary therewith, is a strap structure comprising a transverse base part 16, from which the end piece or hinge knuckle arm 13 projects, and a longitudinal strap ear 17 projecting inwardly from the rearward end of said base part and angularly thereto. Said base part 16 fits into and is embraced by a notch 10 at the temporal end of a rim section 1, while the strap ear 17 fits into and is embraced by the adjacent strap seat 9 of the anchor lug 7 with which said temporal end of the rim section is provided. Secured to the inner or nasal ends of the rim sections 1 are supporting arms 18, to the free ends of which nose pad fittings 19 are suitably connected in any desired and known manner. Connected with each supporting arm 18, so as to be unitary therewith is a like strap structure to that already above described, thus comprising a transverse base part 16 and a longitudinal strap ear 17 angular thereto, so that said base part fits into and is embraced by a notch 10 at the nasal end of a rim section 1, while the strap ear 17 fits into and is embraced by the adjacent strap seat 9 of the anchor lug 8 with which said nasal end of the rim section is provided.

The strap structures, for attaching the respective temple and nose pad arms respectively to the anchor lugs 7 and 8 and thus to adjacent end portions of the rim sections 1, having been applied as above described, the same are affixed to said rim sections by passing fastening rivets 20 through the strap ears and thence through the openings 12 of the anchor lugs, whereupon the eyeglass frame is ready for application and fastening of the lenses 3 to the rim sections of said frame.

The top edges of the lenses 3 are opposed to and thus engaged beneath the outer overhang of the peripheral walls 4 of the rim sections so that adjacent marginal portions of the rear faces of said lenses are seated against the ledge portions 5 of said rim sections, whereby the upper peripheral top and side marginal portions of the lenses are firmly embraced and enclosed, top and rear face, by said rim sections. The lenses 3 having been thus assembled with the rim sections 1, the same are firmly but detachably secured thereto by fastening screws 21, which are passed through openings 22 with which the lenses are provided; said openings 22 being located so as to register with the openings 11 of the rim section anchor lugs 7 or 8, as the case may be. The threaded shanks of the fastening screws 21 screw into internally screw-threaded openings 23 with which the strap ears 17 are provided, and which are aligned with said openings 11 of the anchor lugs, when the strap ears are operatively engaged and secured in the seats 9 of said anchor lugs. The heads 24 of the fastening screws 21 bear on washers 25, and disposed intermediate said washers 25 and the underlying surfaces of the lenses 3 are interposed auxiliary resilient washers 26, whereby tightening stresses of the fastening screws, when the latter are screwed home, are cushioned, and are thus prevented from cracking the lenses, while nevertheless exerting a firm and secure thrust upon the latter, whereby to firmly hold the same seated in the embrace of the rim sections without relative looseness or play.

In the construction of the strap devices for securing frame fittings, such as temples and nose bridge or nose pad elements, to the rim sections, means are provided for reenforcing the same against distortion, and especially against bending or like displacement of the strap ears 17 relative to the base parts 16. One, and perhaps a preferred means, for thus reenforcing the strap devices, comprises forming across the angle intermediate the strap ear 17 and the base part 16 one or more diagonal strengthening or bracing elements 27. Such element 27 may be produced by indenting the material of the strap device and driving the same inward to form a bracing rib extending between the base 16 and ear 17 across the internal angle therebetween (see more particularly Figs. 7 to 9 inclusive). When this construction is employed, the material of the rim section 1, which is embraced within the angle of the strap device, is indented or notched as at 28 (see Fig. 4) to receive said bracing element or rib 27, thus also further enhancing the interlocked relation of the strap device to the rim section, whereby to firmly embrace and hold the rim section material against warping or other distortion.

Another alternative means for firmly interlocking the strap device with the rim section material, while at the same time reenforcing the former against bending and displacement, is shown in Fig. 10, and comprises the provision of a bracing lug 29 to overlie the external edge of the rim section peripheral wall 4, preferably in countersunk relation thereto. In this construction a fastening screw 30 is passed through the strap ear 17 and thence through the rim section material, to screw into the bracing lug 29. Use of such fastening screw 30 eliminates necessity for employing the fastening rivet 20 of the previously described construction.

Another modified form of means for firmly interlocking and bracing the strap device in connection with the rim section is shown in Fig. 11, and comprises the provision of a bracing lug 31 to overlie the external edge of the rim section peripheral wall 4, said lug 31 having at its free end an inturned spur 32 which is driven into and imbedded in the material of said rim section.

As shown in Fig. 12, instead of providing the rim sections with an integral intermediate nose bridge portion as shown in Figs. 1 to 4 inclusive, the rim sections 1 may comprise separate members, the same being joined by a metallic nose bridge 33 and nose-pad elements 34, secured to and between the nasal sides of the rim sections 1 by any of the above described strap structures.

Having now described by way of illustration certain embodiments of my invention, I desire to point out that I am aware that various changes could be made in the above-described constructions, and that widely different embodiments of the invention could be made without departing from the scope thereof as defined by the following claims; consequently it is intended that all matter contained in the above description or shown in the accompanying drawings shall be interpreted as illustrative and not in a limiting sense.

I claim:

1. In an eyeglass frame, a lens supporting rim section of plastic material, said rim section having an integral anchor lug formation projecting inwardly therefrom flush to the plane of the inner lens contacting face so as to overlie a surface of a lens served by said rim section, said anchor lug having a countersunk seat in its external face open endwise toward the outer peripheral edge of said rim section and terminating in an intersecting notch extending across said edge, a strap structure for uniting a frame fitting with said rim section and its anchor lug, said strap structure comprising a base portion and a strap ear angular thereto respectively seated in said notch and countersunk seat, means to both reenforce said strap structure against distortion and to prevent relative bending displacement of the strap ear and base portion thereof, and fastening means passing through a lens and the overlying anchor lug to engage said strap ear, whereby to attach the lens to the rim section.

2. In an eyeglass frame, a lens supporting rim section of plastic material, said rim section having an integral anchor lug formation projecting inwardly therefrom to overlie a surface of a lens served by said rim section, said anchor lug having a countersunk seat in its external face open endwise toward the outer peripheral edge of said rim section and terminating in an intersecting notch extending across said edge, a strap structure for uniting a frame fitting with said rim section and its anchor lug, said strap structure comprising a base portion and a strap ear angular thereto respectively seated in said notch and countersunk seat, said strap structure having bracing and reenforcing means extending between its base portion and strap ear across the included angle therebetween, the rim section having a recess to receive said bracing and reenforcing means, and a fastening screw passing through said lens and the overlying anchor lug to screw into said strap ear, whereby to attach the lens to the rim section.

3. In an eyeglass frame, a lens supporting rim section of plastic material, said rim section having an integral anchor lug formation projecting inwardly therefrom to overlie a surface of a lens served by said rim section, said anchor lug having a countersunk seat in its external face open endwise toward the outer peripheral edge of said rim section and terminating in an intersecting notch extending across said edge, a strap structure for uniting a frame fitting with said rim section and its anchor lug, said strap structure comprising a base portion and a strap ear angular thereto respectively seated in said notch and countersunk seat, said strap structure having bracing and reenforcing means extending between its base portion and strap ear across the included angle therebetween, the rim section having a recess to receive said bracing and reenforcing means, fastening means for securing the strap ear to the anchor lug, and a fastening screw passing through said lens and the overlying anchor lug to screw into said strap ear, whereby to attach the lens to the rim section.

4. In an eyeglass frame, a lens supporting rim section of plastic material to extend along the top marginal portions of a lens between temporal and nasal sides thereof, said rim section having a forwardly open angular lens receiving seat to embrace said lens marginal portions, said rim sections having anchor lugs respectively projecting inwardly from temporal and nasal portions thereof, said anchor lugs having countersunk seats in their rear faces open endwise toward the adjacent outer peripheral edges of said rim section and terminating in intersecting notches extending across said peripheral edges, said anchor lugs being flush with the lens face engaging surface of the rim section lens receiving seat so as to overlie the rear face of a lens seated therein, strap structures for uniting frame fittings with said rim section and its anchor lugs, said strap structures comprising angularly related base portions and strap ears respectively seated in said notches and countersunk seats, said strap structures having bracing and reenforcing means extending between their base portions and strap ears across the included angle therebetween, the rim section having recesses to receive said bracing and reenforcing means, and fastening screws passing through said lens and the overlying anchor lugs to screw into said strap ears, whereby to attach the lens to the rim section.

5. In an eyeglass frame, a lens supporting rim section of plastic material to extend along the top marginal portion of a lens between temporal and nasal sides thereof, said rim section having a forwardly open angular lens receiving seat to embrace said lens marginal portion, said rim sections having anchor lugs respectively projecting inwardly from temporal and nasal portions thereof, said anchor lugs having countersunk seats in their rear faces open endwise toward the adjacent outer peripheral edges of said rim section and terminating in intersecting notches extending across said peripheral edges, said anchor lugs being flush with the lens face engaging surface of the rim section lens receiving seat so as to overlie the rear face of a lens seated therein, strap structures for uniting frame fittings with said rim section and its anchor lugs, said strap structures comprising angularly related base portions and strap ears respectively seated in said notches and countersunk seats, said strap structures having bracing and reenforcing means extending between their base portions and strap ears across the included angle therebetween, the rim section having recesses to receive said bracing and reenforcing means, fastening means for securing the strap ears to the anchor lugs, and fastening screws passing through said lens and the overlying anchor lugs to screw into said strap ears, whereby to attach the lens to the rim section.

ROLAND T. COOK.